S. C. HICKMAN.
PULLING JACK FOR MOTOR VEHICLES.
APPLICATION FILED MAY 22, 1916.
1,243,172.
Patented Oct. 16, 1917.
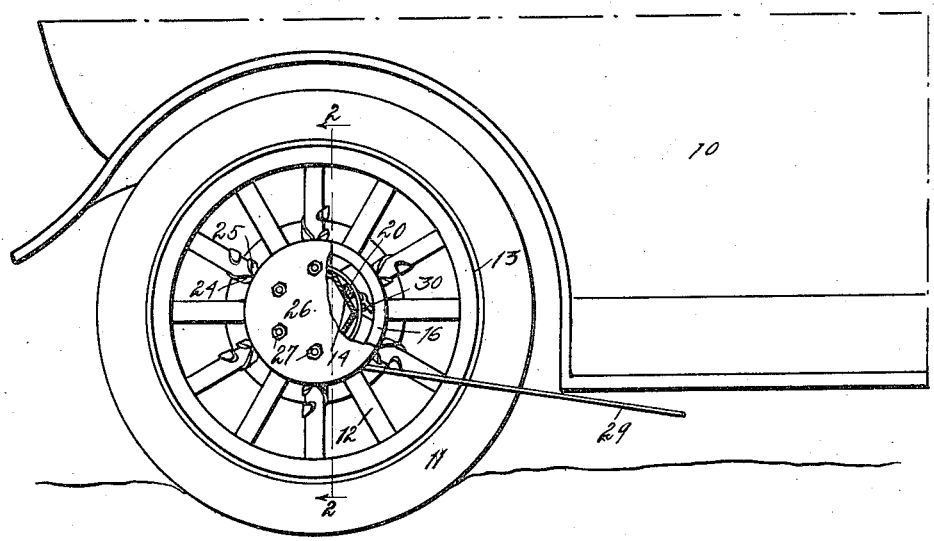
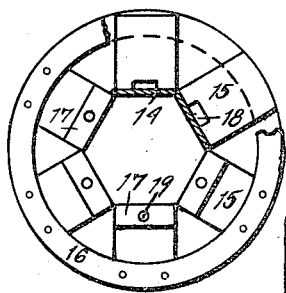
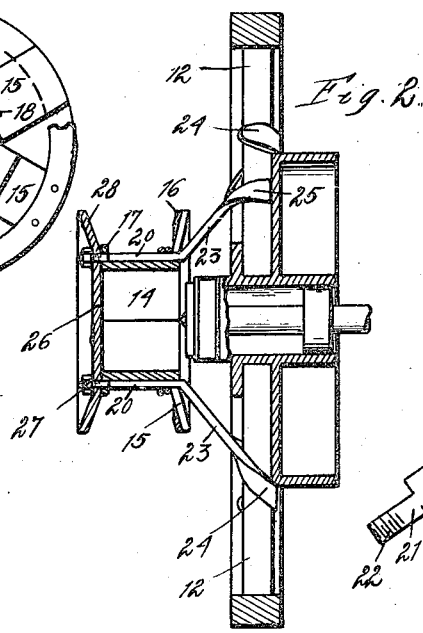
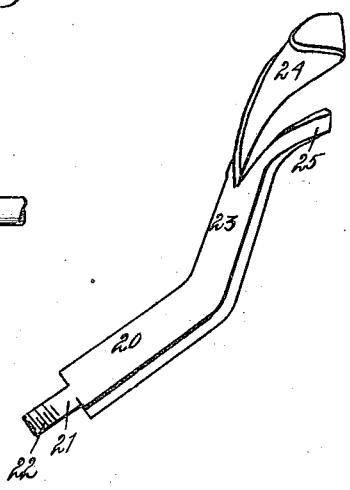
Witness.
G. F. Turecek.
Inventor:
S. C. Hickman
by Orwig & Bair
Attys.

UNITED STATES PATENT OFFICE.

STEPHEN C. HICKMAN, OF CHARITON, IOWA.

PULLING-JACK FOR MOTOR-VEHICLES.

1,243,172.

Specification of Letters Patent. Patented Oct. 16, 1917.

Application filed May 22, 1916. Serial No. 99,219.

*To all whom it may concern:*

Be it known that I, STEPHEN C. HICKMAN, a citizen of the United States, and resident of Chariton, in the county of Lucas and State of Iowa, have invented a certain new and useful Pulling-Jack for Motor-Vehicles, of which the following is a specification.

My invention relates to pulling jacks for motor vehicles of the type adapted to be detachably mounted on traction wheels thereof, and having a drum on which may be wound a rope or chain secured to a post, stake or other stationary object, whereby the motor car may be drawn out of a mud hole or the like by its own power.

A further object is to provide a device of the kind mentioned comprising a drum with means for quickly and easily attaching the drum to the wheel of a motor vehicle.

A further object is to provide such a device which can be quickly and easily assembled or taken apart and packed in a comparatively small space.

Still a further object is to provide such a device capable of being made up of detachable parts, the device being so constructed and arranged that most of the parts may be made in standard sizes and by slightly changing the size of two parts, the device may be adjusted for use on car wheels of various sizes.

My invention consists in the construction, arrangement and combination of the various parts of the device whereby the objects contemplated are attained as hereinafter more fully set forth, pointed out in my claims and illustrated in the accompanying drawings, in which:

Figure 1 shows a side elevation of a rear portion of a motor car equipped with a pulling jack embodying my invention.

Fig. 2 shows a vertical, sectional view taken on the line 2—2 of Fig. 1.

Fig. 3 shows a side elevation partly in section and partly broken away of the completed drum of my device, and Fig. 4 shows a perspective view of one of the arms for connecting the drums to the wheel.

In the illustration of my invention, which is shown in the accompanying drawings, I have shown my improved device mounted on the rear wheel of an ordinary automobile and have used the reference numeral 10 to indicate the automobile and the reference numeral 11 to indicate the wheel, which has the spokes 12 and the rim 13.

It will be understood that one of my devices including the drum thereof is designed to be mounted on each rear wheel of a motor vehicle and the ropes or chains or the like are secured to some stationary object either in front or in the rear of the vehicle, and are then wound on the drum.

My improved pulling jack in each case comprises a drum 14 having the form of a hollow tubular portion.

The drum 14 may be made of a piece of sheet metal bent in hexagonal form.

The drum 14 at one end thereof is provided on each of its six sides with an outwardly extending flange 15, which is preferably inclined away from the drum at an obtuse angle with relation thereto.

The outer ends of the flanges 15 are preferably connected and reinforced by means of an annular ring 16 which is secured to all of the flanges 15.

At the other end of the drum 14, opposite each flange 15, is a shorter flange 17 extending radially away from the drum 14. Each flange 15 adjacent to the drum 14 is provided with an angular opening 18. Each flange 17 is provided with an opening 19, preferably round arranged in line with the opening 18 of the opposite flange 15.

The flanges 15 together with the annular member 16 form a retaining device for a rope or the like wound on the drum.

For securing the drum to the wheel of a motor vehicle, I have provided a series of arms each comprising a horizontal portion 20 angular in cross section and designed to fit the openings 18 and having shorter smaller round extensions 21 designed to enter the openings 19 and provided with screw-threads 22 at their ends.

Formed on each member 20 is an extension arm 23 extending from the end of the member opposite the portion 21 and inclined away therefrom at an obtuse angle with relation thereto.

The free end of the extension arm 23 is split and formed into two parts, one of which 24 is bent to a spiral shape and is adapted to be fitted around the spoke 12 of a wheel. The other part of the split end of the extension arm 23 is inclined away from the portion 23 at 25 and is adapted to engage one side of a spoke, as shown in Figs. 1 and 2.

In assembling my improved pulling jack and installing it on the car, it will be understood that there are as many securing arms 20 as the drum has sides. In the form of the device herein illustrated, the drum being hexagonal, there are six of the securing arms.

The portions 20 of the securing arms are extended through the angular openings 18 in the flanges 15 and rest adjacent to the drum sides extending across the drum from end to end with the portions 21 received in the openings 19 in the flanges 17.

Arranged against the end of the drum 14 having the flanges 17 is an annular disk 26 having suitable openings receiving the portions 21, as shown in Fig. 2, and held in position by nuts 27 on the portions 21.

The disk 26 has an outwardly flaring flange 28 which serves as a retaining device for the rope or the like 29.

In mounting the device on a wheel, the retaining arms are preferably placed on the spokes first and the members 20 then inserted through the openings in the flanges of the drums.

When the device has been assembled as hereinbefore described, it will be seen that the drum is rigidly mounted on the wheel, and rigidly supported with relation thereto and is spaced away from the wheel, so that the rope or the like 29 will not be interfered with by the running board when its forward end is fastened to a stake or the like.

It will be noted that the drum is reinforced and braced by the securing arms and also that the annular member 16 serves to reinforce and strengthen the drum.

The disk 26 also serves to strengthen the drum and make it rigid.

My improved device is preferably used in connection with stakes and ropes or the like and preferably arranged substantially, as shown in my application for patent filed March 7, 1916, Serial Number 82,623.

The rope 29 has a hook 30 which can be secured over one of the flanges 15 and one or two windings of the rope may be made on the drum. One of the drums having been secured to each hind wheel of the motor vehicle and the ropes secured at proper points, it will be seen that when the engine is started and the wheels are thrown into gear a great pull will be secured for winding the ropes or cables 29 on the drums, and that the machine can be pulled out of the mud or the like by its own power.

My device has the advantages of extreme simplicity and cheapness of construction; it can be quickly and easily assembled or taken apart; it is easily and readily mounted on the wheel of the motor vehicle without any tool, except a wrench, and when taken apart can be stored in comparatively small space in the tool box or the like.

It does not in any way interfere with any of the working parts of the car and is mounted far enough away from the wheel, so that the car will not be marred or disfigured by the flexible device 29.

Some changes may be made in the construction and arrangement of the parts of my improved pulling jack, without departing from its essential features and purposes, and it is my intention to cover by this application any such changes which may be included within the scope of my claims.

I claim as my invention:

1. In a device of the class described, a drum having at its periphery at its opposite ends flanges, the flanges being arranged in opposite pairs, the flanges at one end being provided with angular openings, the flanges at the other end being provided with round openings, a plurality of arms each having a portion adapted to be secured to a wheel spoke, a portion designed to extend away from the spoke and toward the line of the extended axis of the wheel, a portion angular in cross section extended through one of the angular openings in said flanges, and a reduced cylindrical portion on one end extended through one of said round openings, and locking means on the free end of each of said last described portions.

2. In a device of the class described, a hexagonal drum having a pair of outwardly extending flanges on each side, the members of each pair being arranged at opposite ends of the drum, the members of each pair being provided with openings arranged close to the body of the drum, means for connecting and reinforcing the flanges on one end of the drum, said means and the flanges at each end of the drum forming a retaining means for a rope or cable wound on the drum, a plurality of arms each having a portion designed to engage a spoke of a wheel, a portion inclined away from said first portion, and away from the wheel and toward a line extended from the central axis of the wheel, and a portion extended through the openings of one pair of flanges, the openings in the flanges of one end of the drum and the portion of the arms received therein being irregular in outline to prevent turning of said arms in said last mentioned opening, the last described portions of said arms being arranged to rest adjacent to the respective sides of the drum, an annular member arranged adjacent to the end of the drum opposite that having the connected flanges, provided with a plurality of openings receiving the free ends of said arms, and fastening means on the free ends of said arms.

Des Moines, Iowa, May 2, 1916.

STEPHEN C. HICKMAN.

Copies of this patent may be obtained for five cents each, by addressing the "Commissioner of Patents, Washington, D. C."